(12) United States Patent
Seto et al.

(10) Patent No.: US 11,364,698 B2
(45) Date of Patent: Jun. 21, 2022

(54) PNEUMATIC TIRE PRODUCTION METHOD

(71) Applicant: The Yokohama Rubber Co., LTD., Tokyo (JP)

(72) Inventors: Hideki Seto, Hiratsuka (JP); Shusaku Tomoi, Hiratsuka (JP); Hirokazu Shibata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 490 days.

(21) Appl. No.: 15/301,933

(22) PCT Filed: Apr. 3, 2015

(86) PCT No.: PCT/JP2015/060600
§ 371 (c)(1),
(2) Date: Oct. 4, 2016

(87) PCT Pub. No.: WO2015/152400
PCT Pub. Date: Oct. 8, 2015

(65) Prior Publication Data
US 2017/0190129 A1    Jul. 6, 2017

(30) Foreign Application Priority Data
Apr. 4, 2014  (JP) ............................. JP2014-077774

(51) Int. Cl.
| | | |
|---|---|---|
| *B29D 30/06* | (2006.01) | |
| *B60C 5/14* | (2006.01) | |
| *B29D 30/42* | (2006.01) | |

(52) U.S. Cl.
CPC ......... *B29D 30/0681* (2013.01); *B29D 30/42* (2013.01); *B60C 5/14* (2013.01);
(Continued)

(58) Field of Classification Search
CPC ...... B29D 2030/0682; B29D 2030/423; B29D 2030/428; B29D 30/42; B60C 5/14;
(Continued)

(56) References Cited

U.S. PATENT DOCUMENTS 2,040,466 A  *  5/1936  Christy ................... C09B 45/01
                                                    269/22
2,995,177 A  *  8/1961  Tolonen ................. B29D 30/52
                                                    156/421

(Continued)

FOREIGN PATENT DOCUMENTS

| CN | 103596775 | 2/2014 |
|---|---|---|
| JP | 07-080963 A * | 3/1995 |

(Continued)

OTHER PUBLICATIONS

Mokwena, K.K. & Tang, J, "Ethylene Vinyl Alcohol: A Review of Barrier Properties for Packaging Shelf Stable Foods", Critical Reviews in Food Science and Nutrition, 52:640-650 (2012).*

(Continued)

*Primary Examiner* — Geoffrey L Knable
(74) *Attorney, Agent, or Firm* — Thorpe North & Western

(57) ABSTRACT

In a pneumatic tire production method including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer, after the end portions of the sheet laminate are overlapped, the overlapped portion of the sheet laminate is compression-bonded at a temperature of not less than a glass transition temperature Tg of the thermoplastic resin and not greater than 120° C.

12 Claims, 2 Drawing Sheets

(52) U.S. Cl.
CPC ............. *B29D 2030/0682* (2013.01); *B29D 2030/423* (2013.01); *B60C 2005/147* (2013.01)

(58) Field of Classification Search
CPC ........ B60C 2005/145; B60C 2005/147; B60C 2009/0408
See application file for complete search history.

(56) References Cited

U.S. PATENT DOCUMENTS

| | | | | |
|---|---|---|---|---|
| 4,877,469 | A * | 10/1989 | Szyms | B29C 43/104 156/123 |
| 5,938,869 | A * | 8/1999 | Kaido | B60C 5/14 152/510 |
| 6,328,922 | B1 * | 12/2001 | Mishra | B29C 65/18 264/322 |
| 2009/0288750 | A1 * | 11/2009 | Majumdar | B29D 30/06 152/510 |
| 2012/0248640 | A1 | 10/2012 | Tsuboi et al. | |
| 2013/0269850 | A1 * | 10/2013 | Seto | B60C 19/00 152/450 |
| 2014/0116595 | A1 | 5/2014 | Endo et al. | |

FOREIGN PATENT DOCUMENTS

| | | | |
|---|---|---|---|
| JP | H07-080963 | | 3/1995 |
| JP | H10-129208 | | 5/1998 |
| JP | H11-005261 | | 1/1999 |
| JP | 2006-198848 | | 8/2006 |
| JP | 2006-198848 | A * | 8/2006 |
| JP | 2009-190448 | A * | 8/2009 |
| JP | 2009-241855 | | 10/2009 |
| JP | 2012-171253 | | 9/2012 |
| JP | 2013-086299 | | 5/2013 |
| WO | WO 2012/133252 | | 10/2012 |
| WO | WO 2012/169234 | | 12/2012 |

OTHER PUBLICATIONS

John Wiley & Sons, Polymer Handbook (4th Edition), Table: Glass Transition Temperatures of Polymers, 2005.*

Machine translation of JP 2013-086299, patent document published May 13, 2013.*

International Search Report for International Application No. PCT/JP2015/060600 dated Jun. 23, 2015, 4 pages, Japan.

* cited by examiner

PNEUMATIC TIRE PRODUCTION METHOD

TECHNICAL FIELD

The present technology relates to a pneumatic tire production method.

More particularly, the present technology relates to a pneumatic tire production method by which when a tire is produced by a method including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer, in a step of vulcanization-molding for the tire, opening due to delamination of a splice portion does not occur in the vicinity of the splice portion in which the end portions of the sheet laminate have been overlapped.

BACKGROUND ART

Recently, the use of a sheet laminate obtained by layering an elastomer layer and a sheet of a thermoplastic resin composition containing a thermoplastic resin or a blend of a thermoplastic resin and an elastomer as a tire structural member of a pneumatic tire has been studied.

For example, the use of a sheet laminate obtained by layering an elastomer layer and a sheet of a thermoplastic resin composition containing a thermoplastic resin or a blend of a thermoplastic resin and an elastomer in an innerliner layer or a reinforcing member at appropriate positions of a pneumatic tire has been studied.

To use such a sheet laminate obtained by layering an elastomer layer and a sheet of a thermoplastic resin composition containing a thermoplastic resin or a blend of a thermoplastic resin and an elastomer as a tire structural member, a production technique is used wherein the sheet laminate is wrapped around a tire molding drum and the end portions are lap-spliced and the sheet laminate is subjected to a tire vulcanization step.

Specifically, when a film comprising a sheet of a thermoplastic resin composition containing a thermoplastic resin or a blend of a thermoplastic resin and an elastomer is used in an inner liner, a technique of producing a pneumatic tire having a lap-spliced innerliner layer is used, wherein a laminate sheet, obtained by layering a film which is the thermoplastic resin composition sheet and a tie rubber sheet to be vulcanization-bonded with the film as an elastomer layer, is wrapped around a tire molding drum, the end portions of the laminate sheet are lap-spliced, and the laminate sheet is subjected to a tire vulcanization molding step. This production technique (installing by lap splicing the end portions when installing around the entire circumference) is applied not only to a case in which the sheet is used as an innerliner layer, but also to a case in which the sheet is used as a reinforcing layer at appropriate positions of a tire.

However, when a pneumatic tire is produced via such steps, when it undergoes inflation during vulcanization molding, the bonding condition of the lap splice portion ends up becoming loose due to delamination and the like, and the joint portion formed by splicing ends up opening.

To explain, using FIG. 3, an example in which a sheet laminate 1 containing a film which is a thermoplastic resin composition sheet 2 and an elastomer layer 3 is used as an innerliner layer, as illustrated in FIG. 3, a sheet laminate 1 comprising an elastomer layer 3 and a thermoplastic resin composition sheet 2 containing a thermoplastic resin or a blend of a thermoplastic resin and an elastomer is formed with the required size (length) determined according to the tire size, and lap splice portions S are provided on the two ends thereof, overlapped to form the sheet laminate 1 into an annular shape, and lap-spliced on a tire molding drum (not illustrated). The elastomer layer 3 serves as a tie rubber layer, and has the role of joining with the carcass layer. When one sheet laminate 1 is used, both end portions thereof are lap-spliced to form the sheet laminate 1 into an annular shape. Alternatively, when a plurality of the sheet laminates 1 are used, the respective end portions thereof are lap-spliced and connected to each other, to collectively form a single annular shape. Then other parts (not illustrated) required for tire production are wrapped and the tire undergoes vulcanization molding using a bladder.

With such steps, a phenomenon in which the above thermoplastic resin composition sheet 2 and the elastomer layer 3 (tie rubber layer) vulcanization-bonded with the thermoplastic resin composition sheet 2 delaminate from during vulcanization molding until immediately after molding and the joint portion opens occurs where the thermoplastic resin composition sheet 2 illustrated in FIG. 3 is exposed and in the vicinity 4 of the distal end portion of thermoplastic resin composition sheet 2, and a crack is at first generated. The crack then develops into delamination of the thermoplastic resin composition sheet 2 and opening of the splice joint portion.

To prevent the occurrence of such cracking and opening of the joint portion, various studies have been conducted on the vicinity of the end portions of the sheet laminate 1, and there have been proposals regarding the configuration and the like of the splice portion (see Japanese Unexamined Patent Application Publication Nos. H10-129208A, H11-5261A and 2009-241855A).

There has also been a proposal to heat-seal the splice portions of the thermoplastic resin film sheet to each other by applying heating and pressurizing treatment on the splice portion (see Japanese Unexamined Patent Application Publication No. 2006-198848A).

However, although the above-described conventional techniques have a certain effect on the occurrence of cracking and delamination, improvement is still required.

SUMMARY

The present technology provides a pneumatic tire production method by which when a tire is produced by a method including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer, in the step of vulcanization-molding for the tire, opening due to delamination of a splice portion does not occur in the vicinity of the splice portion in which the end portions of the sheet laminate have been overlapped.

The pneumatic tire production method of the present technology that achieves the object described above has the following configuration (1).

(1) A pneumatic tire production method including a step of overlapping end portions of a sheet laminate and vulcanization molding the tire, the sheet laminate being obtained by layering an elastomer layer and a sheet of a thermoplastic resin composition containing a thermoplastic resin or a blend of a thermoplastic resin and an elastomer, the method includes the step of: after the end portions of the sheet laminate are overlapped, compression-bonding the end portions of the sheet laminate at a temperature of not less than a glass transition temperature Tg of the thermoplastic resin and not greater than 120° C.

This pneumatic tire production method of the present technology preferably has any one of the following configurations (2) to (6).

(2) The pneumatic tire production method according to the above (1), wherein the step of compression-bonding is performed at a pressure of not less than 0.1 MPa and not greater than 1 MPa by pressing a fiber-reinforced rubber bladder, a resin die, or a metal die onto the overlapped portion from a direction perpendicular to a plane of the overlapped portion.

(3) The pneumatic tire production method according to the above (1) or (2), wherein the step of compression-bonding is performed at least at a position between a left and right bead filler top.

(4) The pneumatic tire production method according to any one of the above (1) to (3), wherein the step of compression-bonding is performed with the overlapped portion disposed on a heating plate.

(5) The pneumatic tire production method according to any one of the above (1) to (4), wherein the step of compression-bonding is performed after overlapping the end portions of the sheet laminate obtained by layering an elastomer layer and a sheet of a thermoplastic resin composition containing a thermoplastic resin or a blend of a thermoplastic resin and an elastomer, and before adhering a carcass layer.

(6) The pneumatic tire production method according to any one of the above (1) to (5), wherein the sheet of a thermoplastic resin composition containing a thermoplastic resin or a blend of a thermoplastic resin and an elastomer contains at least nylon.

The pneumatic tire according to the present technology has the following configuration (7).

(7) A pneumatic tire produced by the pneumatic tire production method described in any one of the above (1) to (6).

According to the present technology according to the above (1), a pneumatic tire production method can be provided in which when a tire is produced by a method including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer, in the step of vulcanization-molding for the tire, opening due to delamination of a splice portion is well suppressed in the vicinity of the splice portion in which the end portions of the sheet laminate have been overlapped.

According to the pneumatic tire production method according to any one of the above (2) to (6), a pneumatic tire production method can be provided in which the advantageous effect of the present technology according to the above (1) can be more explicitly exhibited.

According to the pneumatic tire of the present technology according to the above (7), a pneumatic tire can be provided which is obtained by a production method including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer, and in which in the step of vulcanization-molding for the tire, opening due to delamination of a splice portion is well suppressed in the vicinity of the splice portion in which the end portions of the sheet laminate have been overlapped.

BRIEF DESCRIPTION OF DRAWINGS

FIG. 4 is a drawing for explaining the positional relationship within the tire of the lap splice portion when a sheet laminate containing a thermoplastic resin composition sheet and an elastomer layer is used in formation of an innerliner layer.

DETAILED DESCRIPTION

A more detailed explanation of the pneumatic tire production method of the present technology will be given below.

The pneumatic tire production method of the present technology is a method for producing a pneumatic tire including a step of overlapping end portions of a sheet laminate and vulcanization-molding the tire, the sheet laminate being obtained by layering an elastomer layer and a sheet of a thermoplastic resin composition containing a thermoplastic resin or a blend of a thermoplastic resin and an elastomer. The pneumatic tire production method is characterized in that the overlapped portion of the sheet laminate is compression-bonded at a temperature of not less than a glass transition temperature Tg of the thermoplastic resin and not greater than 120° C. after the end portions of the sheet laminate are overlapped.

According to the method of the present technology, molecular movement in the thermoplastic resin is activated by compression bonding of the overlapped portion at a temperature not less than the glass transition temperature Tg of the thermoplastic resin. Therefore, during compression bonding, the elastomer of the elastomer layer and the resin tend to become closer and compression bonding force increases dramatically, and opening of the splice portion can be remarkably prevented even when it undergoes inflation in the vulcanization molding step. Note that the above temperature during compression bonding is the temperature of the "sheet of a thermoplastic resin composition containing a thermoplastic resin or a blend of a thermoplastic resin and an elastomer" when the sheet is compression-bonded. For example, when the thermoplastic resin is a nylon resin, the glass transition temperature is approximately 50° C.

The compression bonding temperature higher than 120° C. is undesirable because the elastomer ends up scorching.

Compression bonding may be performed on a tire molding apparatus but may also be performed by another apparatus. In that case, the methods that may be employed include a method in which the sheet laminate is continuously heated and compression-bonded by being passed between a pair of rotating heating rollers having an appropriate clearance, and a method in which the sheet laminate is heated and compression-bonded in a batch mode using a pair of heating plates having an appropriate clearance. When a pair of rollers or a pair of plates is used for heating, one of the rollers or of the plates may be unheated.

Figure 1:
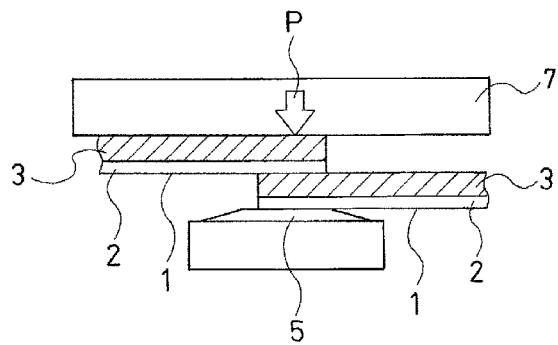
FIG. 1 is a side view schematically illustrating an embodiment of the pneumatic tire production method of the present technology.

FIG. 1 illustrates an example in which the splice portion of a sheet laminate 1 is placed between a heater 5 and a heating plate 7, and heat and pressure are directly applied to the splice portion between the two.

Figure 2:
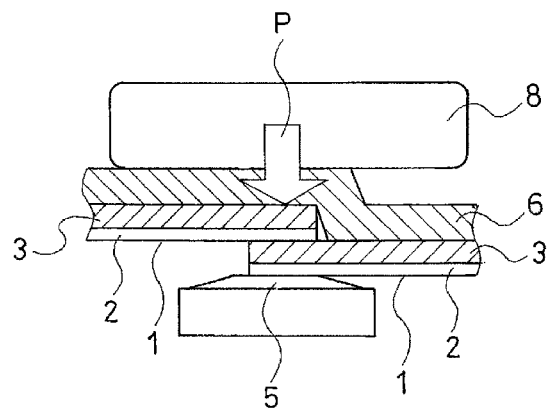
FIG. 2 is a side view schematically illustrating another embodiment of the pneumatic tire production method of the present technology.
Figure 3:
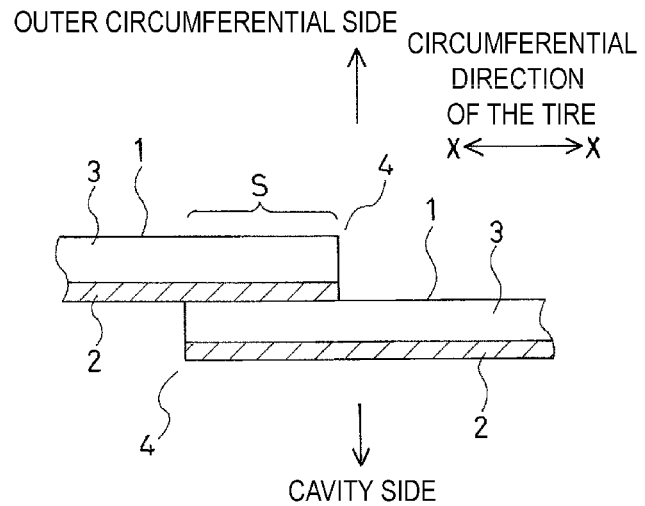
FIG. 3 is a side view schematically illustrating a state (before vulcanization molding) in which, a sheet laminate including an elastomer layer 3 and a thermoplastic resin composition sheet 2 containing a thermoplastic resin or a blend of a thermoplastic resin and an elastomer has lap splice portions S provided at the two ends thereof, and the lap splice portions S are overlapped so as to form the sheet laminate into an annular shape on a tire molding drum (not illustrated).

FIG. 2 illustrates an example performed on a tire molding apparatus, in which a sheet laminate 1 and a carcass layer 6 are bonded, and then the splice portion of the sheet laminate 1 is placed between a heater 5 and a bladder 8, and heat and pressure are applied to the splice portion via the carcass layer between the two.

When performed on a tire molding apparatus, it is preferably performed by pressing a fiber-reinforced rubber bladder, a resin die, or a metal die onto the overlapped portion of the sheet laminate 1 from a direction perpendicular to the plane of the overlapped portion.

In the present technology, the used sheet laminate 1 obtained by layering an elastomer layer 3 and a sheet 2 of a thermoplastic resin composition containing a thermoplastic resin or a blend of a thermoplastic resin and an elastomer may be a layered structure of the two layers, but it may also be a layered structure of three layers in which the elastomer layers 3 are layered on the front and rear faces of the sheet 2 of a thermoplastic resin composition containing a thermoplastic resin or a blend of a thermoplastic resin and an elastomer.

Furthermore, the thermoplastic resin is not limited to the case where one type is used, and a blend of two or more types may be used. In that case, the "glass transition temperature Tg of the thermoplastic resin" in the present technology is taken on the basis of the glass transition temperature Tg of a thermoplastic resin having the lowest glass transition temperature. Preferably, when a plurality of types of thermoplastic resin are used, the present technology should be implemented at a temperature not less than the glass transition temperatures Tg of all of the used thermoplastic resins and not greater than 120° C.

Compression bonding should be performed at a pressure in the range of not less than 0.1 MPa and not greater than 1 MPa, and in particular, when performed by pressing a fiber-reinforced rubber bladder, a resin die, or a metal die, compression bonding is preferably performed within that range of pressure. When the pressure during compression bonding is a low value less than 0.1 MPa or the like, it is undesirable because the compression bonding effect is sometimes insufficient. When performed at a high pressure such as pressure greater than 1 MPa, it is undesirable because the sheet laminate member or other member sometimes ends up being crushed.

The duration of compression bonding varies depending on the applied pressurizing force and cannot be categorically determined, but generally, it is preferably not less than 1 second and not greater than 30 seconds in order to sufficiently obtain the advantageous effect of the present technology. The duration of less than 1 second is undesirable because it is difficult to sufficiently obtain a compression bonding effect. The duration of longer than 30 seconds is undesirable because productivity decreases.

Furthermore, it is preferred that compression bonding be performed at least at a position between a left and right bead filler top. In particular, this is because the splice readily opens because the position between the left and right bead filler top undergoes large lift during tire molding and there is generally no reinforced portion, and thus a great advantageous effect is obtained when that position is heated and compression-bonded.

From the perspective of ease of temperature control, compression bonding is preferably performed by directly disposing the overlapped portion of the sheet laminate on a heating object such as a heating plate. Conversely, the tire itself may be compression-bonded by ambient heating, but this is generally not preferred because temperature control is difficult.

In the present technology, compression bonding is preferably performed after overlapping the sheet laminate 1 and before adhering the carcass layer. This is because if heating and compression bonding is performed after the carcass is adhered to the sheet laminate, if heated all the way to the carcass when lift occurs during tire molding, the rubber between the carcass cords softens and opening readily occurs, which are undesirable.

It is preferred that the sheet of a thermoplastic resin composition containing a thermoplastic resin or a blend of a thermoplastic resin and an elastomer contain at least a nylon resin. This is because a nylon resin has excellent durability and heat resistance, and is suitable for use in tires.

Figure 4:
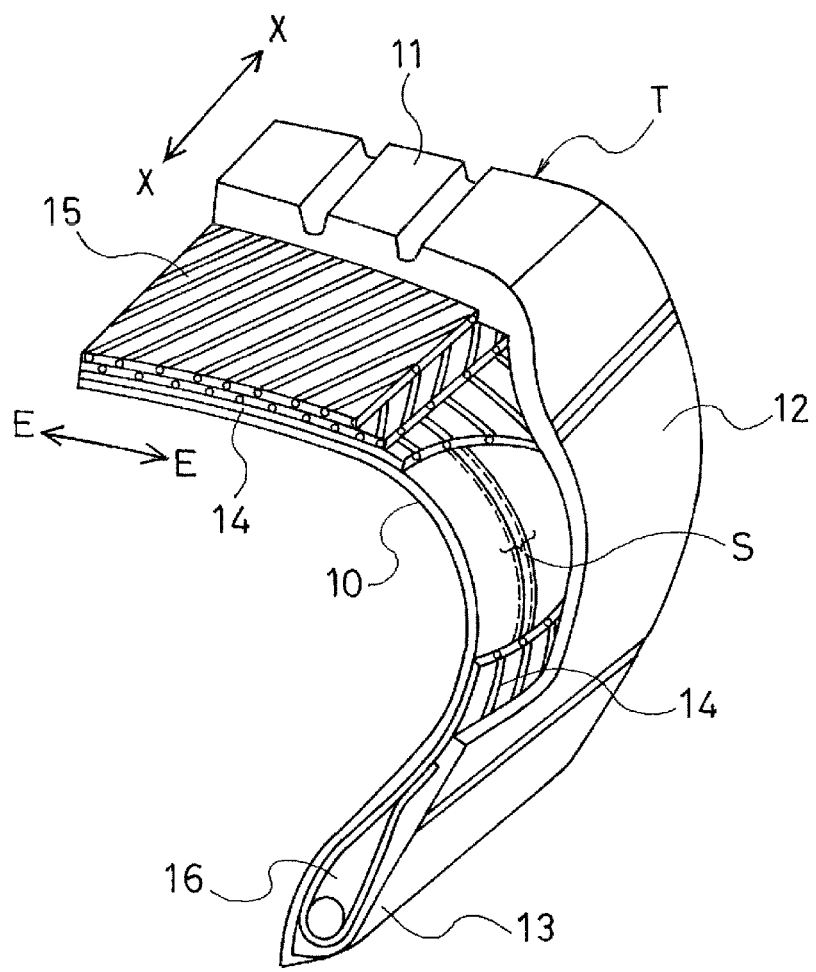
FIG. 4 is a partially fragmented perspective view illustrating an example of a typical configuration of a pneumatic tire obtained by the production method of the present technology.

FIG. 4 is a partially fragmented perspective view illustrating an example of an embodiment of the pneumatic tire according to the present technology.

A pneumatic tire T is provided with a side wall portion 12 and a bead portion 13 that are continuously connected on the left and right of a tread portion 11. On the tire inner side of the pneumatic tire T, a carcass layer 14 that acts as a framework of the tire is provided so as to extend between the left and right bead portions 13, 13 in the tire width direction. Two belt layers 15 composed of steel cords are provided on the outer circumferential side of the carcass layer 14 corresponding to the tread portion 11. The arrow E indicates the tire width direction, and the arrow X indicates the tire circumferential direction. An innerliner layer 10 is disposed on an inner side of the carcass layer 14, and a splice portion S thereof is present extending in the tire width direction. A bead filler is denoted as 16, and the aforementioned bead filler top is the outermost position in the tire radial direction of this member 16.

EXAMPLES

The present technology will be described in detail below with reference to working examples and the like.

Working Examples 1 to 7 and Comparative Examples 1 to 2

As test tires, five test tires were produced for each of Working Examples 1 to 7 and Comparative Examples 1 and 2. The test tires had a tire size of 195/65R15 91H (15×6J) and had a tire structure with two belt layers and one carcass layer.

In each of the test tires, the composition listed in Table 1 was used as the thermoplastic resin composition sheet 2 (thickness of 130 μm) that forms the inner liner and the composition listed in Table 2 was used as the elastomer layer 3 (thickness of 0.7 mm) that is the tie rubber. The test tire underwent vulcanization molding, and was evaluated by judging whether or not the splice portion could be molded without delaminating in the vulcanization molding step. The lap length (tire circumferential length of overlapped splice portion) was 10 mm in all the test tires. The thermoplastic resin was N6/N66, having a glass transition temperature Tg of approximately 50° C.

TABLE 1

| | | Parts by mass |
|---|---|---|
| BIMS[a] | "Exxpro 3035" made by ExxonMobil Chemical Co. | 100 |
| Zinc oxide | "Zinc Oxide III" made by Seido Chemical Industry Co., Ltd. | 0.5 |
| Stearic acid | Industrial stearic acid | 0.2 |
| Zinc stearate | "Zinc stearate" made by NOF Corporation | 1 |
| N6/66 | "UBE Nylon 5033B" made by Ube Industries, Ltd. | 100 |
| Modified EEA[b] | "HPR-AR201" made by Dupont-Mitsui Polychemicals Co., Ltd. | 10 |

Remarks:
[a] Brominated isobutylene-p-methylstyrene copolymer
[b] Maleic anhydride-modified ethylene-ethylacrylate copolymer

TABLE 2

| | | Parts by mass |
|---|---|---|
| Styrene butadiene rubber | made by Zeon Corporation "Nipol 1502" | 50 |
| Natural rubber | SIR-20 | 50 |
| Carbon black | made by Tokai Carbon Co., Ltd "Seast V" | 60 |
| Stearic acid | Industrial stearic acid | 1 |
| Aroma oil | made by Showa Shell Sekiyu KK "Desolex No. 3" | 7 |
| Zinc oxide | made by Seido Chemical Industry Co., Ltd. "Zinc Oxide III" | 3 |
| Modified resorcin formaldehyde condensate | made by Taoka Chemical Co., Ltd. "Sumikanol 620" | 2 |
| Methylene donor | Modified etherified methylolmelamine made by Taoka Chemical Co., Ltd. "Sumikanol 507 AP" | 6 |
| Sulfur | 5% oil-extension treated sulfur | 6 |
| Vulcanization accelerator | Di-2-benzothiazolyl disulfide made by Ouchi Shinko Chemical Industrial Co., Ltd. "NOCCELER DM" | 2.2 |

The test tires were manufactured while varying the compression bonding method or the pressure, temperature, or duration thereof as shown in Table 3, and each test tire was evaluated visually on the basis of the evaluation criteria below.

The evaluation results are as shown in Table 3. As the compression bonding method, for those listed as "Stitcher," the splice portion was compression-bonded at a speed of 60 cm/minute at 0.7 MPa by rolling a metal stitcher having a cylindrical shape of 14 cm in diameter and 5 cm in height. For those listed as "Press," a heating plate and a fiber-reinforced air-filled bladder inflated to an air pressure of 0.4 MPa were used, wherein the heating plate was disposed on the inner liner side and the air-filled bladder was disposed on the carcass side. For those in which a stitcher was used, pressure was applied by mechanical control using a hydraulic pump. Those marked as "Entire width" for the compression bonding range were compression-bonded for the entire width in the width direction of the thermoplastic resin composition sheet 2.

TABLE 3-1

| | Comparative Example 1 | Comparative Example 2 | Working Example 1 | Working Example 2 |
|---|---|---|---|---|
| Compression bonding method | Stitcher | Press | Stitcher | Press |
| Compression bonding temperature (° C.) | 25 | 25 | 50 | 50 |
| Compression bonding pressure (MPa) | 0.7 | 0.7 | 0.7 | 0.2 |
| Compression bonding duration (seconds) | 1 round-trip (60 sec) | 30 | 1 round-trip (60 sec) | 3 |
| Compression bonding range | Entire width | Entire width | Entire width | Entire width |
| Evaluation of splice opening | Poor | Poor | Good | Good |

TABLE 3-2

| | Working Example 3 | Working Example 4 | Working Example 5 | Working Example 6 | Working Example 7 |
|---|---|---|---|---|---|
| Compression bonding method | Press | Press | Press | Press | Press |
| Compression bonding temperature (° C.) | 50 | 120 | 120 | 120 | 120 |
| Compression bonding pressure (MPa) | 0.2 | 0.2 | 0.7 | 0.2 | 0.7 |
| Compression bonding duration (seconds) | 30 | 3 | 30 | 3 | 30 |
| Compression bonding range | Entire width | Entire width | Entire width | Between filler tops | Between filler tops |
| Evaluation of splice opening | Excellent | Excellent | Excellent | Good | Good |

(1) Evaluation of Opening Resistance of Splice Portion:

For five test tires produced for each of Working Examples 1 to 7 and Comparative Examples 1 and 2, a three-level evaluation was performed according to the following evaluation criteria.

(a) Excellent . . . No delamination was seen at the splice portion in any of the five tires (b) Good . . . Delamination measuring not greater than 1 mm×1 mm was seen in at least one of the tires (delamination was not seen in others)

(c) Poor . . . Delamination measuring greater than 1 mm×1 mm was seen in at least one of the tires (delamination was not seen in others)

The invention claimed is:

1. A pneumatic tire production method including a step of overlapping end portions of a sheet laminate and vulcanization-molding the tire, the sheet laminate consisting of two layers obtained by layering a tie rubber layer and a sheet of a thermoplastic resin composition containing a thermoplastic resin or a blend of a thermoplastic resin and an elastomer, wherein the sheet of the thermoplastic resin composition containing the thermoplastic resin or the blend of the thermoplastic resin and the elastomer contains at least nylon, the pneumatic tire production method comprising the step of:

after the end portions of the sheet laminate are overlapped by contacting the sheet of the thermoplastic resin composition and the tie rubber layer with each other, compression-bonding the end portions of the sheet laminate at a temperature of not less than a glass transition temperature Tg of the thermoplastic resin and less than 80° C., at a duration of not less than 1 second and not greater than 30 seconds, and at a pressure of not less than 0.2 MPa and not greater than 1 MPa by pressing a fiber-reinforced rubber bladder onto the overlapped portion from a direction perpendicular to a plane of the overlapped portion.

2. The pneumatic tire production method according to claim 1, wherein the tire has a pair of bead portions, a bead filler is arranged on an outer peripheral side of each bead portion, and the step of compression bonding is performed at least at a position between bead filler tops positioned on an outermost side in a tire radial direction of the bead fillers.

3. The pneumatic tire production method according to claim 1, wherein the step of compression bonding is performed with the overlapped portion disposed on a heating plate.

4. The pneumatic tire production method according to claim 1, wherein the step of compression bonding is performed after overlapping the end portions of the sheet laminate obtained by layering the tie rubber layer and the sheet of the thermoplastic resin composition containing the thermoplastic resin or the blend of the thermoplastic resin and the elastomer, and before adhering a carcass layer.

5. The pneumatic tire production method according to claim 2, wherein the step of compression bonding is performed with the overlapped portion disposed on a heating plate.

6. The pneumatic tire production method according to claim 5, wherein the step of compression bonding is performed after overlapping the sheet laminate obtained by layering the tie rubber layer and the sheet of the thermoplastic resin composition containing the thermoplastic resin or the blend of the thermoplastic resin and the elastomer, and before adhering a carcass layer.

7. The pneumatic tire production method according to claim 1, comprising compression-bonding the end portions of the sheet laminate at a duration of not less than 7 seconds and not greater than 30 seconds.

8. The pneumatic tire production method according to claim 1, comprising compression-bonding the end portions of the sheet laminate at a duration of not less than 22 seconds and not greater than 30 seconds.

9. The pneumatic tire production method according to claim 1, wherein a thickness of the tie rubber layer is greater than a thickness of the sheet of the thermoplastic resin composition.

10. The pneumatic tire production method according to claim 9, wherein the thickness of the tie rubber layer is multiple times greater than the thickness of the sheet of the thermoplastic resin composition.

11. The pneumatic tire production method according to claim 9, wherein the tie rubber layer is present only on one side of the laminate and the sheet of the thermoplastic resin composition is exposed at a tire cavity side of the laminate.

12. The pneumatic tire production method according to claim 1, wherein compression-bonding the end portions of the sheet laminate by pressing the fiber-reinforced rubber bladder onto the overlapped portion comprises pressing the overlapped portion between the bladder and a heater such that heat and pressure are applied locally only to a splice portion where the end portions of the sheet laminate overlap.

* * * * *